INVENTOR.
JAMES F. LEE
BY
BUCKHORN, CHEATHAM & BLORE
ATTORNEYS

United States Patent Office 3,222,524
Patented Dec. 7, 1965

3,222,524
RADIOGRAPHIC EXAMINATION APPARATUS COMPRISING A PLURALITY OF COLLIMATED SOURCES
James F. Lee, Menlo Park, Calif., assignor of forty-nine percent to Ind-X Corporation, Seattle, Wash., a corporation of Washington
Filed Nov. 13, 1961, Ser. No. 151,992
9 Claims. (Cl. 250—106)

The present invention relates to a method of and apparatus for radiographic examination.

It is an object of the present invention to provide a method of and apparatus for obtaining radiographic shadow graphs of maximum resolution.

Still another object is to provide a method of and apparatus for making radiographic examinations of high resolution utilizing a plurality of sources of low individual intensity.

A still further object of the present invention is to provide a method of and apparatus for making radiographic examinations rapidly and with a minimum of exposure time.

Still other objects and advantages of the invention will become more apparent hereinafter.

In accordance with the invention a plurality of sources of gamma rays or X-rays of relatively low intensity are arranged substantially in a plane and the radiation from each source collimated in a direction normal to such plane so as to provide a plurality of substantially parallel beams of radiation. The sources are arranged in such a pattern that upon movement of an object being X-rayed through the beams, each portion of the object will be subjected to radiation from a plurality of sources and to a uniform amount of radiation throughout, the resulting shadow graph having better resolution than would be obtainable with a single source of equivalent energy.

For further details of the invention reference is made to the following detailed description thereof taken in conjunction with the accompanying drawings, wherein.

Figure 1:
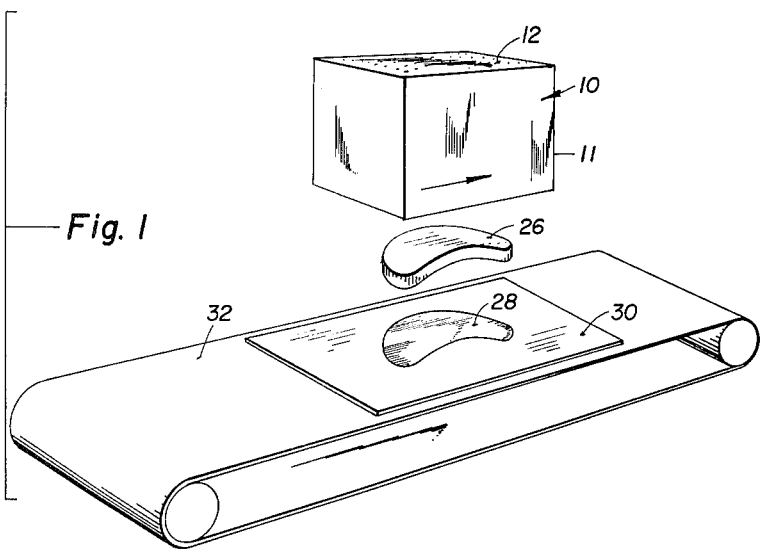
FIG. 1 is a schematic perspective view of apparatus embodying the invention.
Figure 3:
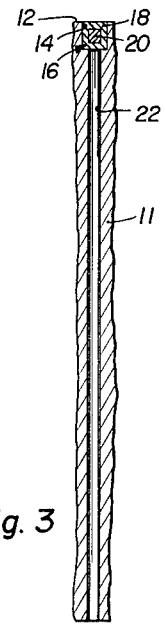
FIG. 3 is a reduced sectional view taken along line 3—3 of FIG. 2.

Referring now to the drawings, indicated at 10 is a collimating device constructed in accordance with the invention and comprising a relatively massive, rectangular block or body 11 of radiation opaque material, such as lead, tungsten, or the like. The body 11 is provided with a plane surface 12 in which is formed a plurality of openings 14 each adapted to receive a source of penetrative radiation, that is, gamma rays or X-rays. In the illustrated embodiment the openings 14 are cylindrical and are adapted to retain a cylindrical capsule 16 containing a gamma ray or X-ray source. A suitable capsule for this purpose is a presently commercially available capsule comprising aluminum walls 18 encompassing a length of cylindrical wire 20 of a radioactive material such as gamma emitting iridium. As will become apparent the sources should be of substantially equal intensity.

Concentric with each of the openings 14 is a bore or passage 22 extending from the opening downwardly through the body 11 to the lower surface thereof. Preferably the passages 22 are of the same diameter as the source material 20 and preferably the body 11 has a dimension such that the length of each passage 22 is many times the diameter thereof. It will be apparent that this construction will serve substantially to collimate the radiation emerging from the passages 22 so that substantially parallel circular streams of radiation emerge from the block 10.

Figure 2:
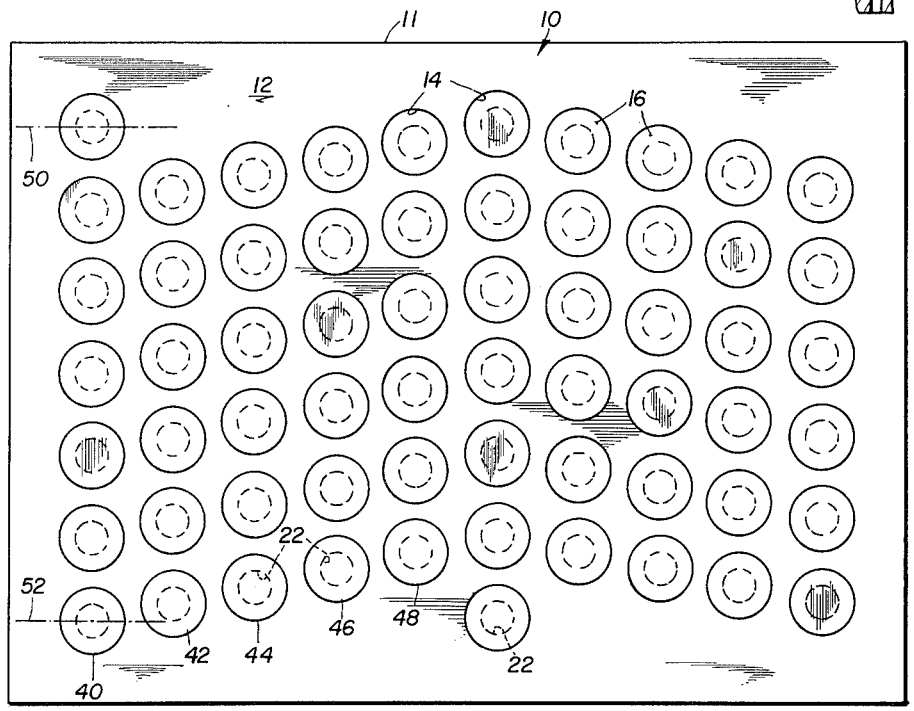
FIG. 2 is a top plan view of the collimating block utilized in the invention.

In accordance with the invention the openings 14 are so arranged in the body 11 that upon movement of the block in a given direction past an object to be examined, indicated at 26 in FIG. 1, the object will be subjected to a substantially uniform field of collimated radiation so as to obtain a shadow indicated at 28 of accurate resolution upon a sensitive medium 30 positioned parallel to the face 12 of the body 11. As indicated in FIG. 1 the medium 30 may be mounted upon a conveyor 32 positioned beneath the collimating device 10 which may be supported above the conveyor in any suitable manner. The medium 30 may be a photographic plate or fluorescent screen or other media responsive to the radiation from the sources utilized. While for purposes of illustration the object 26 is shown displaced from the medium 30, it should be understood that in actual practice the object and medium should be as close to each other as possible and ordinarily the object would be placed directly upon the medium so as to be supported on and moved by the conveyor 32. The openings 14 preferably are also so arranged that in passage over the object 26 being examined each portion of the object will be subjected to radiation from a plurality of sources. This enables sources of relatively low individual intensity to be utilized permitting at the same time, however, relatively rapid passage of the object 26 beneath the device 10. A suitable arrangement of the sources 16 for the above mentioned purposes is shown in FIG. 2 from which it will be seen that the sources are arranged in rows, such as indicated at 40, 42, 44, 46, 48, etc., extending normal to the direction of movement of the body 11 relative to the object 26, the openings in each row being offset from the openings of the adjacent row by a distance equal to the radius of the passages 22. The pattern shown is repeated twice though it will be apparent that other patterns and times of repetition can be used. In any event, and in the arrangement shown, the number of rows and the positioning of the openings 14 is such that when viewed in the direction of relative movement of the body 11, between limits indicated by lines 50–52, a substantially uniform field of radiation exists beneath the body 11. Expressing it in another way, the total amount of radiation which exists in an increment or band of given width extending the length of the body 11 parallel to and between the lines 50–52 is equal in amount to that in any like increment. This follows, of course, from the fact that a pair of parallel planes of given spacing, parallel to the axis of the passages 22 and lines 50–52, will intersect equal volumes in the passages 22 and openings 14 in any location between the lines 50–52 thus permitting equal amounts of radiation to pass from the sources 16.

It will be observed that upon movement of the object 26 the full length of the device 10, each portion thereof will be subjected to radiation from four of the sources 16 and thus will receive a substantial amount of radiation as compared to the intensity of an individual source.

As will be apparent then, in operation of the apparatus of the invention the radiation sensitive medium 30 is placed on the conveyor 32 and the object to be examined positioned thereon. The conveyor is then operated to advance the object 26 and media 30 beneath the collimating device 10 and the full length thereof. During the traverse of the radiation the object 26 will be subjected to radiation from a number of sources and in the aggregate a substantial amount so that the conveyor may be advanced relatively rapidly permitting rapid repetition of exposures. Since the radiation is well collimated a shadowgraph of good resolution will be obtained.

Obviously any suitable sources of gamma rays or X-rays may be utilized in the invention and instead of moving the medium 30 and object 26, these may be held stationary and the collimating device moved relative thereto.

While I have described a particular embodiment of my invention, it should be apparent to those skilled in the art that the invention permits of modification in arrangement and detail. I claim as my invention all such modifications as come within the scope of the appended claims.

I claim:

1. Apparatus for use in radiographic examination comprising:
   a plurality of sources of penetrative radiation of substantially uniform intensity arranged substantially in a plane,
   and means collimating said radiation from each of said sources to provide a plurality of parallel beams of radiation of uniform intensity extending perpendicularly to said plane in one direction,
   said sources and said means being so arranged as to provide a field of uniform intensity between predetermined parallel limits as viewed in a direction parallel to said limits.

2. Apparatus for use in radiographic examination comprising:
   a plurality of sources of penetrative radiation of substantially uniform intensity arranged substantially in a plane,
   and means collimating said radiation from each of said sources to provide a plurality of parallel beams of radiation of uniform intensity extending perpendicularly to said plane in one direction,
   said sources and said means being so arranged as to provide a field of uniform intensity between predetermined parallel limits as viewed in a direction parallel to said limits,
   said sources being further arranged so that any line lying in said plane and parallel to said limits intersects a like plurality of sources.

3. Apparatus for use in radiographic examination comprising a body of a material relatively opaque to penetrative radiation having a plane surface,
   said body having a plurality of parallel passages of like size therethrough extending normal to said plane,
   a source of penetrative radiation mounted in each of said passages,
   each source being of uniform intensity and equally spaced from said plane,
   said passages being positioned in said body in such an array that between predetermined parallel limits said passages define an equal volume in any increment of said body of a given width lying between and parallel to said limits and extending the full length of said body.

4. A device for use in radiographic examination comprising a rectangular body of a material relatively opaque to penetrative radiation,
   said body having a plurality of openings of like size in one surface thereof,
   a source of penetrative radiation mounted in each of said openings,
   each said source comprising a capsule having walls of uniform, predetermined thickness of a material transparent to said radiation defining a cavity,
   an emitter of said radiation in each said cavity,
   said body having a plurality of parallel passages therethrough concentric one with each of said cavities,
   said passages having a cross-section substantially identical and aligned with said capsule cavities,
   said body having a thickness such that said passages have a length at least several times their width,
   said openings and passages being positioned in said body in such an array that between predetermined parallel limits said openings and passages define an equal volume in any increment of said body of a given width lying between and parallel to said limits and extending the full length of said body.

5. A device for use in radiographic examination comprising a rectangular body of a material relatively opaque to penetrative radiation,
   said body having a plurality of cylindrical openings of like size in one surface thereof,
   a source of penetrative radiation mounted in each of said openings,
   each said source comprising a right cylindrical capsule having walls of uniform, predetermined thickness of a material transparent to said radiation defining a right cylindrical cavity,
   an emitter of said radiation in each said cavity,
   said body having a plurality of parallel passages therethrough concentric one with each of said openings,
   said passages having a diameter substantially equal to the diameter of said capsule cavities,
   said body having a thickness such that said passages have a length at least several times their diameter,
   said openings and passages being positioned in said body in such an array that between predetermined parallel limits said openings and passages define an equal volume in any increment of said body of a given width lying between and parallel to said limits and extending the full length of said body.

6. Apparatus for use in radiographic examination comprising a rectangular body of a material relatively opaque to penetrative radiation,
   said body having a plurality of cylindrical openings of like size in one surface thereof,
   a source of penetrative radiation mounted in each of said openings,
   each said source comprising a right cylindrical capsule having walls of uniform, predetermined thickness of a material transparent to said radiation and defining a right cylindrical cavity,
   an emitter of said radiation in each said cavity,
   said body having a plurality of parallel passages therethrough concentric one with each of said openings,
   said passages having a diameter substantially equal to the diameter of said capsule cavities,
   said body having a thickness such that said passages have a length at least several times their diameter,
   said openings and passages being positioned in said body in such an array that between predetermined parallel limits said openings and passages define an equal volume in any increment of said body of a given width lying between and parallel to said limits and extending the full length of said body,
   means for supporting a planar radiation sensitive medium parallel to said one surface,
   and means for moving said body and said medium relative to one another in the direction parallel to said limits so that said medium is exposed to radiation emitted from passages.

7. The method of radiographic examination of an object which comprises:
   providing a plurality of sources of penetrative radiant energy,
   collimating the radiation from said sources to provide a plurality of substantially parallel beams of radiant energy of substantially uniform intensity,
   said sources being aranged so that said beams when viewed in one direction normal thereto present a field of substantially uniform intensity from edge-to-edge,
   providing a planar medium responsive to said radiant energy,
   placing an object to be examined in a fixed position adjacent said medium, and moving said sources parallel to said plane rectilinearly in said direction past said object so as to obtain a shadow picture thereof upon said medium.

8. The method of radiographic examination of an object which comprises:
   providing a plurality of sources of penetrative radiant energy of substantially uniform intensity,
   positioning said sources substantially in a plane, said sources being of uniform cross section in said plane,
collimating the radiation from said sources so as to obtain a plurality of substantially parallel beams of radiant energy extending at right angles to said plane,
said sources being arranged in a pattern so that said beams when viewed parallel to said plane in at least one direction present a field of substantially uniform intensity from edge-to-edge,
positioning parallel to said plane a planar medium responsive to said radiant energy,
placing an object to be examined in a fixed position relative to said medium and between said medium and said object and moving said sources and said object and said medium relative to each other so that said sources move in said plane rectilinearly in said direction relative to said object and medium.

9. The method of radiographic examination of an object which comprises:
providing a plurality of sources of penetrative radiant energy of substantially uniform intensity.
positioning said sources substantially in a plane,
said sources being of identical circular cross section in said plane,
collimating the radiation from said sources so as to obtain a plurality of substantially parallel circular beams of radiant energy extending at right angles to said plane,
said sources being arranged in a uniform pattern so that said beams when viewed parallel to said plane in at least one direction present a field of substantially uniform intensity from edge-to-edge and any line drawn parallel to said direction will intersect a plurality of sources,
positioning a planar medium response to said radiant energy parallel to said plane,
placing an object to be examined in a fixed position relative to said medium and between said medium and said sources and moving said sources and said object and said medium relative to each other so that said sources move in said plane rectilinearly in said direction relative to said object and medium.

References Cited by the Examiner
UNITED STATES PATENTS

| | | | |
|---|---|---|---|
| 2,665,387 | 1/1954 | Bartow | 250—105 |
| 2,872,585 | 2/1959 | Kallenberg et al. | 250—66 |
| 2,883,552 | 4/1959 | Faulkner, et al. | 250—106 |

RALPH G. NILSON, *Primary Examiner.*

ARCHIE R. BORCHELT, *Examiner.*